March 17, 1970     R. L. ALLEN ET AL     3,501,279
DIESEL FUEL ANTISMOKE ADDITIVE
Filed Jan. 12, 1967     2 Sheets-Sheet 1
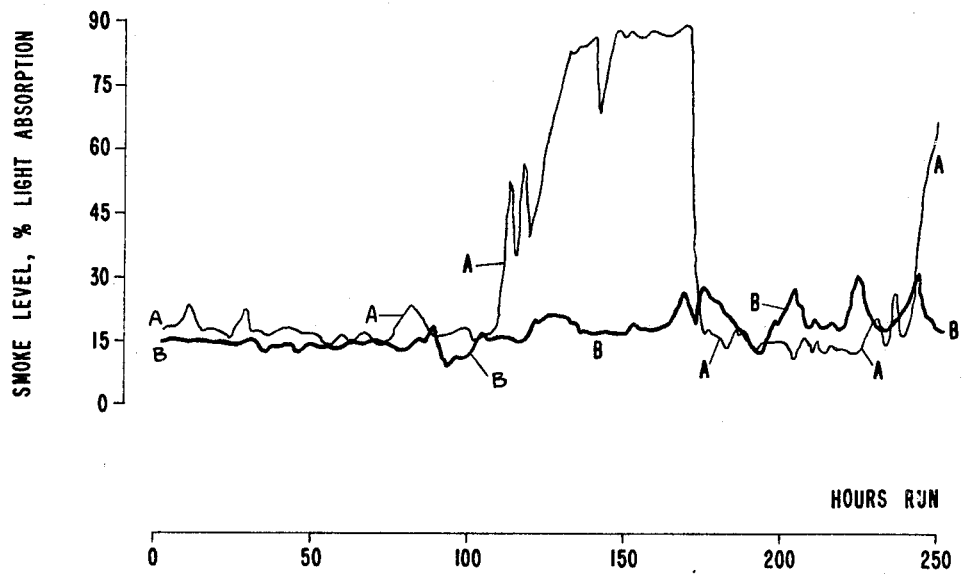
FIG. 1
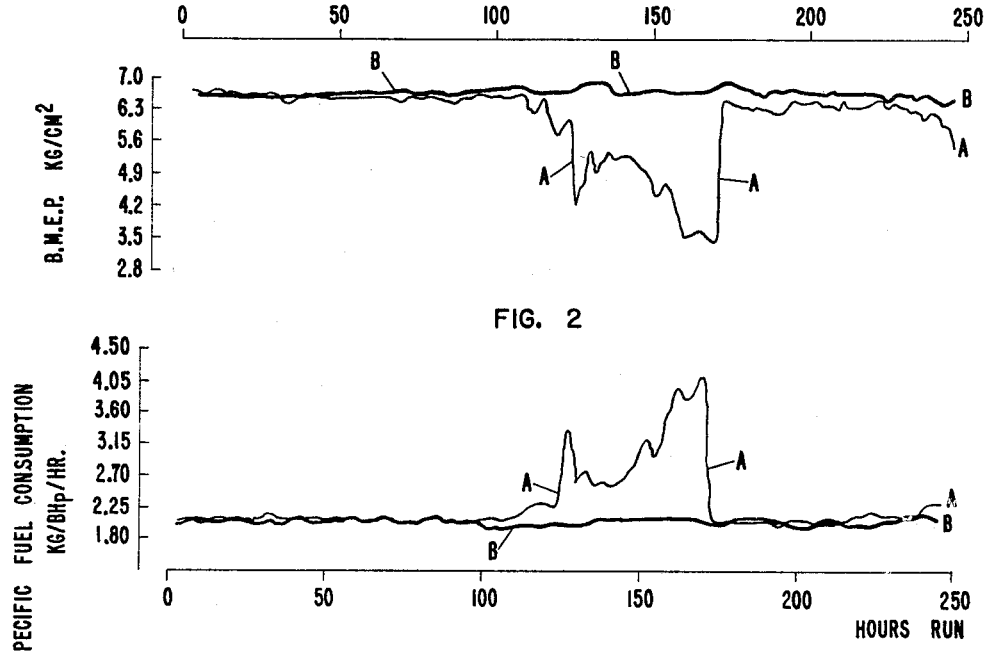
FIG. 2
FIG. 3
INVENTORS:
ROY L. ALLEN
RONALD BURT
BY: Harold L. Denkler
THEIR ATTORNEY INVENTORS:
ROY L. ALLEN
RONALD BURT
BY: Harold S. Denkler
THEIR ATTORNEY

United States Patent Office 3,501,279
Patented Mar. 17, 1970

3,501,279
DIESEL FUEL ANTISMOKE ADDITIVE
Roy L. Allen, Wrexham, North Wales and Ronald Burt, Cheshire, England, assignors to Shell Oil Company, New York, N.Y., a corporation of Delaware
Filed Jan. 12, 1967, Ser. No. 608,925
Claims priority, application Great Britain, Jan. 18, 1966, 2,342/66
Int. Cl. C10l 1/18
U.S. Cl. 44—70   7 Claims

ABSTRACT OF THE DISCLOSURE

Alkaline earth metal salts of alpha-alkylalkane monocarboxylic acid and diesel fuels containing said salts as an antismoke agent.

---

Figure 4:
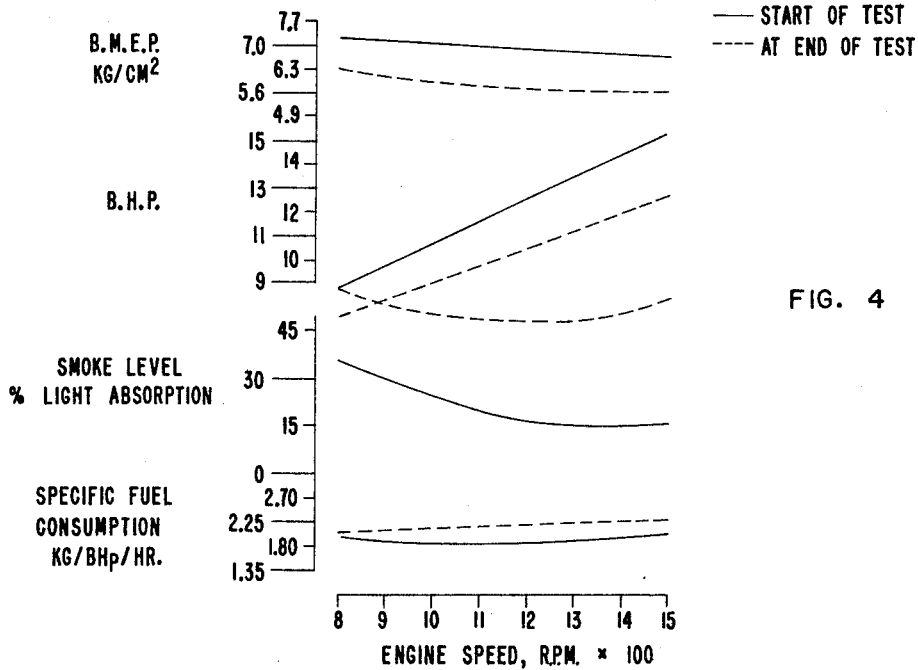
Figure 5:
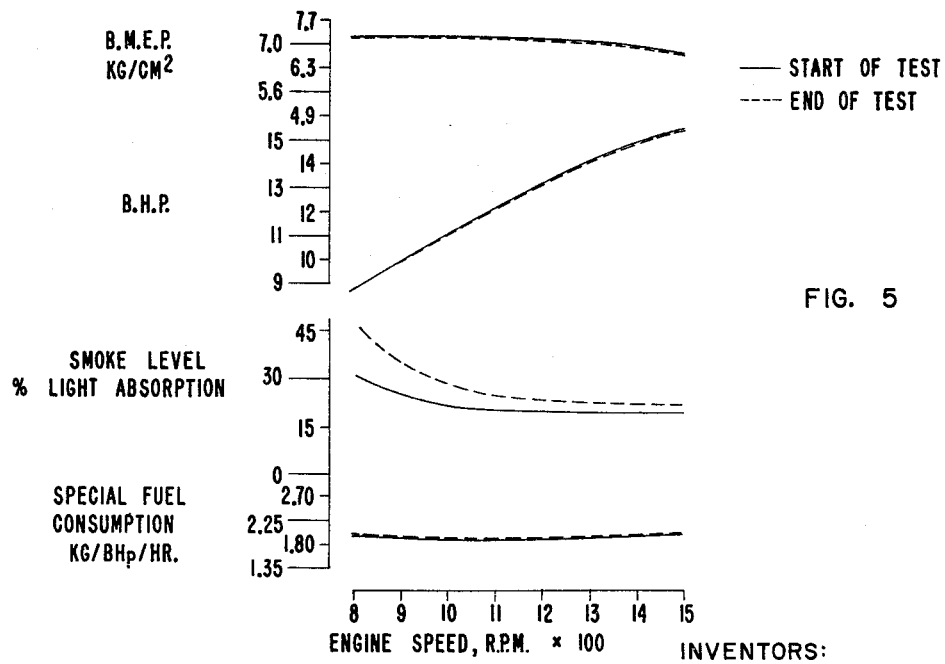

The emission of smoke from the exhausts of compression ignition (or diesel) engines is a known phenomenon which, although in itself harmless, needs attention in view of the increasing air pollution from other sources. This refers especially to the exhaust smoke developed by the modern, small, high speed, highly rated automative diesel engine which over the past decade has become increasingly competitive with the gasoline engine. Despite the attention given to the exhaust smoke problem by engine manufacturers, the large number of diesel engines now on the road has created a diesel exhaust smoke problem of concern to engine user and general public.

It is known that the amount of exhaust smoke developed in diesel-engined vehicles may be reduced by using antismoke additives in the fuel. For example, U.S. Patents 3,085,866 and 3,124,433 and U.K. Patent 888,325 mention alkaline earth metal sulfonates, and calcium petroleum sulfonate is mentioned in U.K. Patent 914,777.

It has now been found that an alkaline earth metal salts of an alpha-alkylalkane monocarboxylic acid, believed to be novel compounds, are effective to reduce the amount of diesel engine exhaust smoke when included in minor amounts in the hydrocarbon fuel to the engine. Compared with other compounds having ability to inhibit the formation of smoke in diesel engine exhaust, the present antismoke agents have other advantages, as will be apparent from the following discussion.

Alkaline earth metal salts of fatty acids and naphthenic acids, for example calcium naphthenates, are known as anticorrosion additives for diesel fuels from Belgian Patent 499,650. Applicants have found that these salts also show antismoke properties. They are, however, unsuitable for the purpose of the invention owing to side effects such as water-retention, filter blocking and injector fouling. These side effects are not shown by the alkaline earth metal salts according to the invention.

In this specification, hydrocarbons for use as fuel in a diesel engine mean hydrocarbons and mixtures of hydrocarbons which are known in the art as fuels for diesel engines. Examples are kerosene, gas oil and the heavy fuels used in the larger diesel engines such as marine diesel engines. Properties of diesel fuels are given in Table 3–19, page 56 of Petroleum Refinery Engineering, fourth ed., by W. L. Nelson (McGraw-Hill, 1958).

The fuels of the invention contain an alkaline earth metal salt of an alpha-alkylalkane monocarboxylic acid. These acids have the structural formula

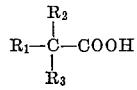

wherein $R_1$ is a hydrocarbon radical having from 1 to 30 carbon atoms, $R_2$ is a hydrocarbon radical having from 1 to 15 carbon atoms and $R_3$ is hydrogen or a hydrocarbon radical having from 1 to 10 carbon atoms. Hydrocarbon radicals $R_1$, $R_2$ and $R_3$ can have substituent groups, e.g. ether groups, hydroxyl groups and halogen atoms.

The alkaline earth metal salts of these acids are new compounds of matter which can be prepared by using any suitable method for preparing salts, e.g., by reacting the acid with an alkaline earth metal hydroxide. Alkaline earth metals as used herein includes the metals Mg, Ca, Ba and Sr.

Preferred fuels are those containing alkaline earth metal salts of acids having the structural formula shown above wherein $R_1$ is an alkyl group having from 1 to 30 carbon atoms, $R_2$ is an alkyl group having from 1 to 15 carbon atoms and $R_3$ is hydrogen or an alkyl group having from 1 to 10 carbon atoms. The alkyl groups $R_1$, $R_2$ and $R_3$ can have aromatic groups as substituents.

Especially preferred fuels are those containing alkaline earth metal salts of acids having the structural formula shown above wherein two of the hydrocarbon radicals are methyl groups.

Salts of acids having 6 to 10 carbon atoms in the molecule often tend to give gels when dissolved in diesel fuels. This gel formation can easily be prevented by adding stabilizing agents like ethylene glycol monoethyl ether, usually 1% w. or less calculated on the alkaline earth metal salt being sufficient to stabilize the solution of the salt in the diesel fuel.

Salts of acids having less than 6 carbon atoms in the molecule have little solubility in diesel fuels and are present therein in a dispersed form. The concentrates of these salts in a carrier liquid are dispersions which may be stabilized, if desired, by the addition of a dispersant, for example, an ashless dispersant such as a copolymer having polar groups or an alkenyl succinimide having a substituent containing polar groups attached to the nitrogen atom of the succinimide ring. The dispersant can also be a "metallic" dispersant like calcium naphtha sulfonate or calcium alkyl salicyclate. Combinations of ashless dispersants and "metallic" dispersants can also be used to stabilize a concentrate containing a salt of an acid having less than 6 carbon atoms in the molecule. From these concentrates, stable dispersions in the diesel fuel are obtained.

Preference is given to fuels containing salts which need no stabilizers or dispersant to form a stable solution or dispersion. These preferred fuels contain alkaline earth metal salts of acids having more than 10 carbon atoms. Especially preferred are fuels containing alkaline earth metal salts of acids having from 15 to 20 carbon atoms, or in other words salts of acids of which the total number of carbon atoms present in the groups $R_1$, $R_2$ and $R_3$ amounts to from 13 to 18.

Alkaline earth metal salts according to the invention can be conveniently obtained when using as the starting material alpha-alkylalkane monocarboxylic acids prepared from olefins, carbon monoxide and water. A convenient method for preparing alpha-alkylalkane monocarboxylic acids is described in British Patent 871,278.

The synthesis of alpha-alkylalkane monocarboxylic acids from olefins, carbon monoxide and water, yields a mixture of acids owing to isomerization of the carbonium ion initially formed during the synthesis, up to about 90% and often more of the acids having the carboxylic acid group attached to a quaternary carbon atom carrying two methyl groups.

The alkaline earth metal salt present in the diesel fuel of the invention, can be a neutral salt or a basic salt. In this specification, the term "basic salt" refers to a product which contains more than 1 equivalent of metal per molecule of monocarboxylic acid, and does not necessarily indicate a true basic salt. Several methods for preparing basic salts which contain more than one equivalent of metal per molecule of monocarboxylic acid, are described in the art. For example, British Patents 786,167; 790,471 and 790,473 describe basic salts in which the excess amount of metal over that required to neutralize the acid, is present in the form of alkaline earth metal carbonate.

Preference is given to fuels containing basic salts. Preferred basicities are those ranging from 200 to 1000%, i.e., salts containing 3 to 11 equivalents metal per molecule of monocarboxylic acid.

Of the alkaline earth metal salts, the barium salts are preferred because on a molar basis, the barium salts are more effective additives than the other alkaline earth metal salts. As a result, a fuel containing a certain weight percentage of metal in the form of barium salt, shows the same performance as a fuel containing the same weight percentage of metal in the form of calcium salt. This means that less alpha-alkylalkane monocarboxylic acid is needed when using the barium salt as an antismoke additive. Of the barium salts, the 500% basic barium salts of alpha-alkylalkane monocarboxylic acids obtained from $C_{15-19}$ olefins, carbon monoxide and water are especially preferred.

The amount of alkaline earth metal salt in the diesel fuel composition of the invention can be chosen in accordance with the seriousness of the exhaust smoke under consideration. Alkaline earth metal salts are active as antismoke additive in concentrations as low as 0.01% w. expressed as metal. Concentrations as high as 1% w., expressed as metal, can be used, if desired. Preferred concentrations of salts are those corresponding with 0.02% w. to 0.50% w. of metal in the fuel, in particular 0.03 to 0.20% w. of metal.

It is often desirable to use a concentrate of the alkaline earth metal salts in a suitable carrier. Preferable carrier liquids are lubricating oil, gas oil, kerosene, white spirit and the like which can be added to a diesel fuel without adversely affecting other desired properties of the fuel. Stabilizers or dispersants can be used to prepare a stable concentrate of relatively high amounts of salts, e.g., on the order of 10–25% by weight or more metal.

Additives which impart other desired characteristics to the final fuels can be included in the concentrate or in the fuel. Such additives, known in the art, include, for example, ignition improvers, detergents, antioxidants, metal-deactivators, pour point depressants and antifoam agents.

The invention and its advantages are illustrated with the following examples.

EXAMPLE 1

Alpha-alkylakane carboxylic acids prepared from propylene trimer, carbon monoxide and water using the method described in British Patent 871,278 and consisting of 91% of carboxylic acids having the carboxylic acid group attached to a quaternary carbon atom carrying two methyl groups and one hexyl group, were converted into their neutral calcium salts as follows:

172 parts by weight of the acids mixture having an acid value of 326 mg. KOH/g. were mixed with 37 parts by weight of calcium hydroxide. The mixture was heated for 2 hours at 85° C. at a pressure of 18 mm. mercury. The reaction product, 190 parts by weight of the neutral calcium salt of $C_{10}$-carboxylic acids, was dissolved in 3 liters of kerosene and the solution obtained was filtered. To the filtrate were added 2 parts by weight of ethylene glycol monoethylether. A stable solution of the neutral calcium salt of $C_{10}$-carboxylic acids was obtained.

EXAMPLE 2

A neutral strontium salt of the same $C_{20}$-carboxylic acids mixture from which the neutral calcium salt of Example 1 was obtained, was prepared as follows:

172 parts by weight of the acids mixture having an acid value of 326 mg. KOH/g. were mixed with 61 parts by weight of strontium hydroxide. After addition of 1 liter of xylene, the mixture was heated and the water of reaction was removed from the reaction mixture by azeotropic distillation. The distillation was finished when the theoretical amount of water was removed. The reaction mixture was filtered after cooling and xylene was removed from the filtrate by distillation at 20 mm. mercury. 214 parts by weight of the neutral strontium salt of $C_{10}$-carboxylic acids were obtained as the distillation residue.

EXAMPLE 3

A neutral barium salt of the $C_{10}$-carboxylic acids mixture from which the neutral calcium salt of Example 1 was obtained, was prepared from 172 parts by weight of acids and 85.7 parts by weight of barium hydroxide using the method described in Example 2. 238 parts by weight of the neutral barium salt were obtained.

EXAMPLE 4

A neutral magnesium salt of the $C_{10}$-carboxylic acids mixture from which the neutral calcium salt of Example 1 was obtained, was prepared using the same method as described in Example 2.

EXAMPLE 5

A basic barium salt of $C_{15-19}$-acids mixture prepared from a technical olefin fraction obtained from paraffin cracking, which fraction predominantly consisted of a mixture of olefins having chain lengths varying from 14 to 18 carbon atoms, was obtained as follows:

50 Parts by weight of a colloidal dispersion of barium carbonate in methanol, said dispersion having an alkalinity of 30 mg. KOH/g., were stirred with 30 parts by weight of a 4.27% w. solution in a mineral lubricating oil of the neutral barium salt of $C_{15-19}$-acids. The colloidal barium carbonate was quantitatively transferred to the oil phase. The methanol phase, which separated as clear liquid, was separated and showed almost zero alkalinity. The oil phase contained basic barium $C_{15-19}$-carboxylic acid salt having a basicity of 500%.

EXAMPLE 6

A 500% basic calcium salt of the $C_{15-19}$-carboxylic acids mixture of Example 5 was prepared as follows:

3300 parts by weight of $C_{15-19}$-carboxylic acids mixture having an acid value of 208 mg. KOH/g. were dissolved in 32,000 parts by weight of xylene and were mixed with a slurry comprising 4520 parts by weight of calcium hydroxide and 7000 parts by weight of methanol in a reaction vessel fitted with a stirrer, a reflux condenser and means for bubbling carbon dioxide through a reaction mixture. After mixing with continuous stirring for 30 minutes at 60° C., carbon dioxide was bubbled through the reaction mixture over a period of 3 hours, 1344 parts by weight of carbon dioxide being absorbed in this period. The temperature during the carbon dioxide treatment was 40–45° C.

The resulting reaction product was then filtered at room temperature through a filter precoated with "Clarcel" (the name "Clarcel" is a registered trademark) filter aid to remove suspended solids and the clear filtrate was then added to 4000 parts by weight of gas oil and the methanol and xylene were removed by distillation, together with the water formed during the reaction, to give 7290 parts by weight of a solution of highly basic $C_{15-19}$-carboxylate in gas oil. The basicity of the product was 500%, the calcium content of the concentrate was 20.5% w.

EXAMPLE 7

A fuel composition containing kerosene having a boiling range of from 170–340° C. as the base fuel and as an antismoke additive the neutral calcium salt of a $C_{10}$-acids mixture prepared from propylene trimer, carbon monoxide and water according to British Patent 871,278. The concentration of the salt in the fuel composition corresponded with 0.05% w. calcium.

EXAMPLE 8

A fuel composition containing kerosene having a boiling range of from 179 to 349° C. as the base fuel and as an antismoke additive the neutral strontium salt of the same $C_{10}$-acids mixture as described in Example 7. The concentration of the salt in the fuel composition corresponded with 0.075% w. strontium.

EXAMPLE 9

A fuel composition containing kerosene having a boiling range of from 179 to 349° C. as the base fuel and as an antismoke additive the neutral barium salt of the same $C_{10}$-acids mixture as described in Example 7. The concentration of the salt in the fuel composition corresponded with 0.1% w. of barium.

EXAMPLE 10

A fuel composition containing kerosene having a boiling range of from 179 to 349° C. as the base fuel and as an antismoke additive the 500% basic barium salt of a $C_{15-19}$-acids mixture prepared from cracked wax $C_{14-18}$-olefins, carbon monoxide and water according to British Patent 871,278. The concentration of the basic salt in the fuel composition corresponded with 0.075% w. of barium.

EXPERIMENT 1

The products of Examples 1–6 dissolved in a diesel fuel to a concentration corresponding with 0.1% w. of metal calculated on the diesel fuel composition. The diesel fuel was a petroleum hydrocarbon mixture having an initial boiling point of 179° C. and a final boiling point of 359° C. The smoke performance of each diesel fuel composition was compared with the smoke performance of the base diesel fuel in a Gardner 1L2/LW 4-stroke direct injection single cylinder diesel engine. The engine was run at 700 r.p.m. at a range of loads from 4.22 to 7.38 kg./cm.² break mean effective pressure (B.M.E.P.). The exhaust smoke emission was measured with a full-flow light-absorption smoke meter. At all loads, significant reductions in exhaust smoke emissions were obtained. The results of the measurements at the relatively high load of 7.03 kg./cm.² are represented in Table 1.

TABLE 1

| Fuel tested: | Percent light absorption (load 7.03 kg./cm.²) |
|---|---|
| Base fuel | 83.0 |
| Base fuel+additive of Example 2 | 59.5 |
| Base fuel+additive of Example 3 | 66.0 |
| Base fuel+additive of Example 5 | 61.5 |

From this table it appears that the salts tested all gave a considerable reduction in exhaust smoke relative to the undoped fuel.

EXPERIMENT 2

Since the only prior art antismoke additive available on the market is a basic barium sulfonate, the basic barium salt of Example 5 was used in this comparative experiment. The experimental details are as follows:

The engines used were a Gardner 1L2/LW 4-stroke direct injection single cylinder diesel engine and a Petter 4-stroke single cylinder diesel engine. In both these engine tests the additives were blended into a diesel fuel having an initial boiling point of 179° C. and a final boiling point of 359° C. to give 0.075% w. barium in the finished fuel. The fuel according to the invention contained the additive of Example 5, and the fuel used for comparative purposes contained a 1300% basic barium naphtha sulfonate available commercially.

(A) Gardner 1L2/LW 4-stroke diesel engine

This engine was operated on a cycling procedure which included periods of high speed (1500 r.p.m.) high load (6.75 kg./cm.²), low speed (800 r.p.m.) light load (1 kg./cm.²) and intermediate speeds and loads. Periods of shutdown were also included in the cycle. During the test, measurements of exhaust smoke emission, engine load and fuel consumption at a given engine condition were made every two hours. The total test duration was 245 hours.

Data are shown graphically in the drawing, wherein FIGURE I shows the smoke level produced with each test fuel, FIGURE II shows engine output for each fuel, FIGURE III shows specific fuel consumption for each fuel, and FIGURES IV and V show engine performance data, before and after the 254 hour test, for prior art fuel and fuel of the invention, respectively.

Referring to FIGURE I, smoke level, expresed as percent light absorption, is plotted against the hours run. Curve A represents the results obtained using the fuel containing the prior art additive, curve B represents the results obtained using the fuel according to the invention. With the fuel containing the prior art additive, heavy smoke emission occurs after about 110 hours running, and lasts about 50 hours; thereafter the smoke level is as in the beginning of the test. Toward the end of the test the increase in smoke starts again. The fuel composition according to the invention consistently gives a low level of smoke emission.

The output of the engine, expressed as B.M.E.P., is given in FIGURE II, and the specific fuel consumption in FIGURE III. It may be seen that with the fuel containing the prior art additive (curve A) a decrease to power output and an increase in specific fuel consumption occurs simultaneously with the smoke emission, whereas the fuel composition according to the invention shows a consistent high power output and low specific fuel consumption during the whole of the test.

Before and after the tests just described, the power output, smoke emission and specific fuel consumption were determined for each of the fuels under test. The results for the fuel containing the prior art additive are shown in FIGURE IV and results for the fuel composition according to the invention are shown in FIGURE V. The full lines represent the measurements obtained before, and the broken lines the measurements obtained after the 254-hour test described above. It is clearly demonstrated by these lines that with the fuel according to the invention, the performance of the engine is the same after as before the 254-hour test, but after the 254-hour test carried out with the fuel containing the prior art additive, the engine performance has deteriorated.

(B) Petter 4-stroke air-cooled single cylinder diesel engine

In this test, the fouling of the nozzle spray orifices of the fuel injectors was measured. The fouling of the nozzles was assessed by measuring the time taken for a fixed quantity of fuel to flow through the nozzles before and after a two-hour engine run at two different loads.

The results of the tests are summarized in Table 2:

TABLE 2

| Fuel tested | Percentage increase in flow time through nozzle | |
|---|---|---|
| | 2.81 kg./cm.² B.M.E.P. | 4.22 kg./cm.² B.M.E.P. |
| Base fuel+additive of Example 5 to 0.075% w. Ba | 25.3 | 21.8 |
| Base fuel+1,300% basic barium sulfonates to 0.075% w. Ba | 66.5 | 143.5 |

EXPERIMENT 3

In this experiment, the basic barium salt of Example 5 was compared with a 1000% basic calcium naphthenate with respect to side-effects encountered when using these additives in diesel fuels. The base fuel used was the same as that described in Experiments 1 and 2.

The Petter engine as in Experiment 2B was used to measure the fouling of the nozzle spray orifices of the fuel injector. The percentage increase in flow time for a fixed quantity of fuel through the nozzle, using the base fuel containing the additive of Example 5 to 0.075% w.

barium, was 21.8% whereas the percentage increase found using a 1000% basic calcium naphthenate (prepared from naphthenic acids having an acid value of 170 mg. KOH/g.) to a concentration of 0.05% w. calcium in the fuel, was 200%.

In another test, the water-retention of fuels containing the above barium and calcium salts was measured.

The salts used as additive in the same base fuel as mentioned above, were a 900% basic barium salt prepared from the $C_{15-19}$ acids mixture used for the preparation of the 500% basic barium salt of Example 5, and a 800% basic calcium salt of naphthenic acids having an acid value of 170 mg. KOH/g.

The additives were dissolved in the base fuel to a concentration equivalent to 0.05% w. of metal. 300 ml. of each solution was placed in a bottle having a height to neck of approximately 17 cm. and a diameter of approximately 6 cm. 3 ml. of water were added to each solution and the bottles were closed with a cork stopper covered with aluminum foil. The bottles were shaken for 15 minutes in a shaker with 3.7 cm. stroke at approximately 300 cycles per minute. After this period, the bottles were immersed to the neck into a water bath kept at a temperature of 30° C. The contents of the bottles were observed at intervals. The fuel containing the salt of the invention separated the water readily and was clear after 30 minutes. The fuel containing the calcium naphthenate retained the water added and was still cloudy after 4 hours.

We claim as our invention:

1. A diesel fuel composition consisting essentially of a major amount of a hydrocarbon base fuel and a minor smoke-inhibiting amount of an alkaline earth metal salt of an alpha-alkylalkane monocarboxylic acid having the structural formula

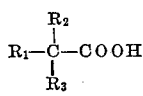

wherein $R_1$ is an alkyl radical having from 1 to 30 carbon atoms, $R_2$ is an alkyl radical having from 1 to 15 carbon atoms, and $R_3$ is selected from the group consisting of hydrogen and an alkyl radical having from 1 to 10 carbon atoms, the total number of carbon atoms of said acid being at least 10.

2. The diesel fuel composition according to claim 1 wherein two of the hydrocarbon radicals are methyl groups.

3. The diesel fuel composition according to claim 1 wherein the alkaline earth metal salt is a salt of an alpha-alkylalkane carboxylic acid having from 15 to 20 carbon atoms.

4. The diesel fuel composition according to claim 2 wherein the alkaline earth metal salt is a barium salt.

5. A diesel fuel composition according to claim 1 wherein the alkaline earth metal salt is a 200% to 1000% basic salt.

6. The diesel fuel composition according to claim 5 wherein the alkaline earth metal salt is a 500% basic barium salt of alpha-alkylalkane carboxylic acids obtained from $C_{14-18}$-olefins, carbon monoxide and water.

7. A diesel fuel composition according to claim 1 wherein the alkaline earth metal salt is present in an amount of from about 0.01% w. to about 1% w. expressed as alkaline earth metal.

References Cited

UNITED STATES PATENTS 3,348,932  10/1967  Kukin _____ 44—57 XR

FOREIGN PATENTS 661,907  4/1965  Belgium.

DANIEL E. WYMAN, Primary Examiner

W. J. SHINE, Assistant Examiner

U.S. Cl. X.R.

44—57